United States Patent
Mesecher

(10) Patent No.: US 6,748,008 B2
(45) Date of Patent: *Jun. 8, 2004

(54) BASE STATION FOR DISTANCE DETERMINATION

(75) Inventor: David K. Mesecher, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/074,398

(22) Filed: Feb. 12, 2002

(65) Prior Publication Data

US 2002/0136266 A1 Sep. 26, 2002

Related U.S. Application Data

(63) Continuation of application No. 09/274,081, filed on Mar. 22, 1999.

(51) Int. Cl.[7] .......................... H04B 15/00; H04K 1/00; H04L 27/30
(52) U.S. Cl. .................. 375/145; 375/149; 375/367; 455/456
(58) Field of Search .................. 375/130, 140–144, 375/148–150; 455/456, 457, 423, 424, 522, 562; 342/127, 457, 145

(56) References Cited

U.S. PATENT DOCUMENTS

| | | | |
|---|---|---|---|
| 4,728,959 A | | 3/1988 | Maloney et al. |
| 5,506,864 A | | 4/1996 | Schilling |
| 5,600,706 A | | 2/1997 | Dunn et al. |
| 5,732,354 A | | 3/1998 | MacDonald |
| 5,736,964 A | | 4/1998 | Ghosh et al. |
| 5,799,010 A | | 8/1998 | Lomp et al. |
| 5,945,948 A | | 8/1999 | Buford et al. |
| 6,047,192 A | | 4/2000 | Maloney et al. |
| 6,070,079 A | | 5/2000 | Kuwahara |
| 6,112,095 A | | 8/2000 | Wax et al. |
| 6,148,195 A | * | 11/2000 | Schuchman et al. ........ 455/424 |
| 6,148,219 A | * | 11/2000 | Engelbrecht et al. .... 455/456.2 |
| 6,163,696 A | * | 12/2000 | Bi et al. ..................... 455/436 |
| 6,226,317 B1 | * | 5/2001 | Bruckert et al. ............ 375/146 |
| 6,229,844 B1 | | 5/2001 | Kong |
| 6,603,800 B1 | * | 8/2003 | Mesecher ................... 375/145 |

FOREIGN PATENT DOCUMENTS

| | | |
|---|---|---|
| EP | 0865223 A2 | 9/1998 |
| WO | WO9747148 | 12/1997 |
| WO | WO9818018 | 4/1998 |

OTHER PUBLICATIONS

Zagami, Parl, Bussgang and Melillo, "Providing Universal Location Services Using a Wireless E911 Location Network", IEEE Communications Magazine, Apr. 1998.

B.P. Lathi, "Modern Digital and Analog Communication Systems", HRW © 1983, pp. 63–65.

* cited by examiner

*Primary Examiner*—Phoung Phu
(74) *Attorney, Agent, or Firm*—Volpe and Koenig, P.C.

(57) ABSTRACT

A base station transmits a first spread spectrum signal having a first code. It receives and analyzes an impulse response of multipath components of a second spread spectrum signal having a second code to determine a first received component. The second signal is time synchronized with the first spread spectrum signal. A distance determination is made based on in part a timing difference between the second code of the received second signal and the first code of the base station's transmitted first signal and the determined first received components for that base station's received second signal.

6 Claims, 14 Drawing Sheets

BASE STATION FOR DISTANCE DETERMINATION

This application is a continuation application of U.S. patent application Ser. No. 09/274,081, filed Mar. 22, 1999.

BACKGROUND

1. Field of the Invention

This invention generally relates to spread spectrum code division multiple access (CDMA) communication systems. More particularly, the present invention relates to a system and method that determines the geographic location of a subscriber unit within a CDMA communication system.

2. Description of the Prior Art

Wireless systems capable of locating a subscriber are presently known in the art. One wireless technique uses the global positioning system (GPS). In GPS, the communication handset receives data transmitted continuously from the 24 NAVSTAR satellites. Each satellite transmits data indicating the satellite's identity, the location of the satellite and the time the message was sent. The handset compares the time each signal was received with the time it was sent to determine the distance to each satellite. Using the determined distances between the satellites and the handset along with the location of each satellite, the handset can triangulate its location and provide the information to a communication base station. However, the incorporation of a GPS within a subscriber unit increases its cost.

Another subscriber location technique is disclosed in U.S. Pat. No. 5,732,354. A mobile telephone using time division multiple access (TDMA) as the air interface is located within a plurality of base stations. The mobile telephone measures the received signal strength from each of the base stations and transmits each strength to each respective base station. At a mobile switching center, the received signal strengths from the base stations are compared and processed. The result yields the distance between the mobile telephone and each base station. From these distances, the location of the mobile telephone is calculated.

Wireless communication systems using spread spectrum modulation techniques are increasing in popularity. In code division multiple access (CDMA) systems, data is transmitted using a wide bandwidth (spread spectrum) by modulating the data with a pseudo random chip code sequence. The advantage gained is that CDMA systems are more resistant to signal distortion and interfering frequencies in the transmission path than communication systems using the more common time division multiple access (TDMA) or frequency division multiple access (FDMA) techniques.

There exists a need for an accurate mobile subscriber unit location system that uses data already available in an existing CDMA communication system.

SUMMARY

A base station transmits a first spread spectrum signal having a first code. It receives and analyzes an impulse response of multipath components of a second spread spectrum signal having a second code to determine a first received component. The second signal is time synchronized with the first spread spectrum signal. A distance determination is made based on in part a timing difference between the second code of the received second signal and the first code of the base station's transmitted first signal and the determined first received components for that base station's received second signal.

BRIEF DESCRIPTION OF THE DRAWING(S)

DETAILED DESCRIPTION OF THE PREFERRED EMBODIMENT(S)

Figure 1:
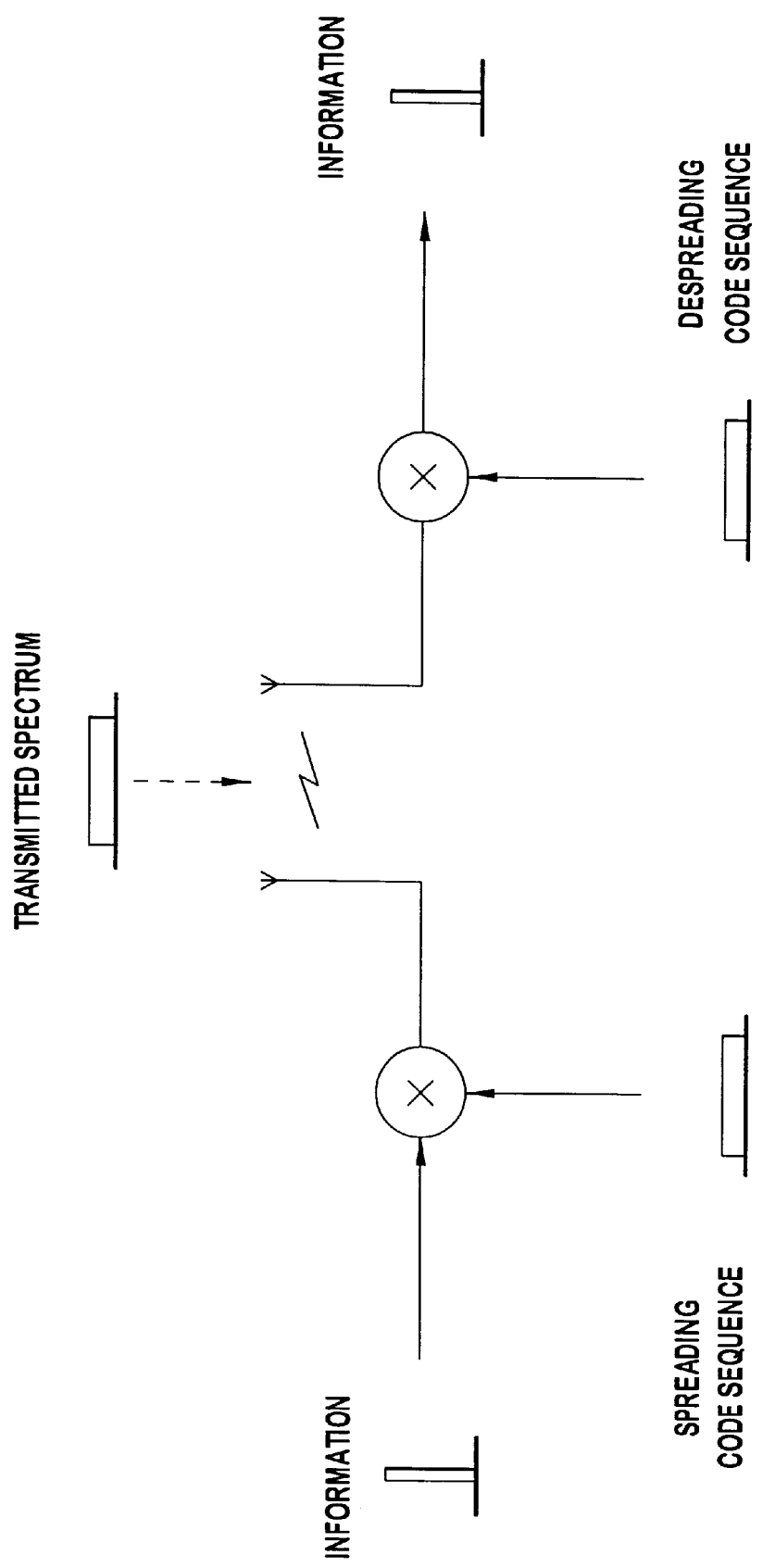
FIG. 1 is an illustration of a simplified, prior art CDMA system.

The preferred embodiments will be described with reference to the drawing figures where like numerals represent like elements throughout.

Shown in FIG. 1 is a simplified CDMA communication system. A data signal with a given bandwidth is mixed with a spreading code generated by a pseudo random chip code sequence generator producing a digital spread spectrum signal. Upon reception, the data is reproduced after correlation with the same pseudo random chip code sequence used to transmit the data. Every other signal within the transmission bandwidth appears as noise to the signal being despread.

For timing synchronization with a receiver, an unmodulated pilot signal is required for every transmitter. The pilot signal allows respective receivers to synchronize with a given transmitter, allowing despreading of a traffic signal at the receiver.

In a typical CDMA system, base stations send global pilot signals to all subscriber units within their communicating range to synchronize transmissions in a forward direction. Additionally, in some CDMA systems, for example a B-CDMA™ system, each subscriber unit sends a unique assigned pilot signal to synchronize transmissions in a reverse direction.

Figure 2:
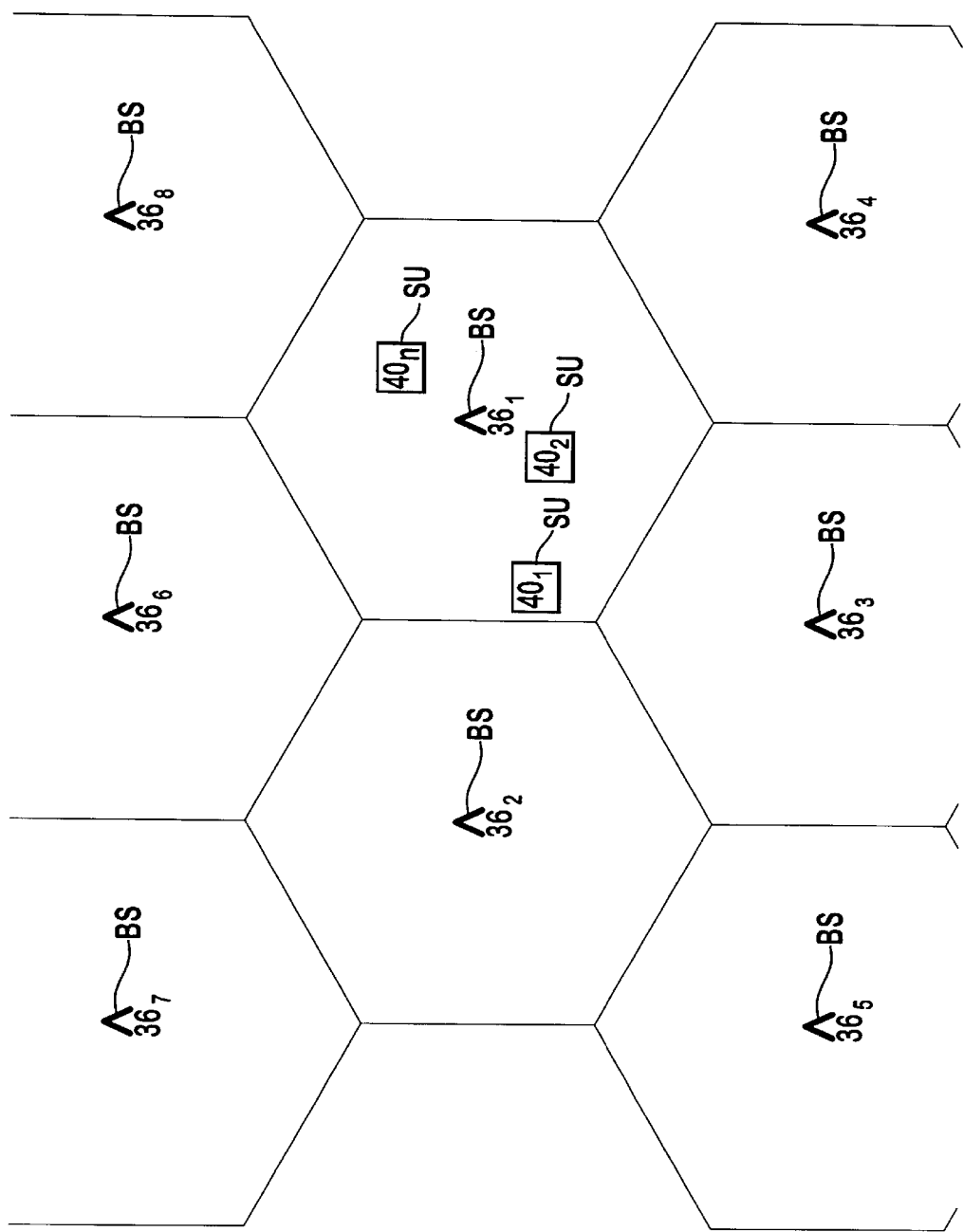
FIG. 2 is an illustration of a prior art CDMA system.
Figure 3:
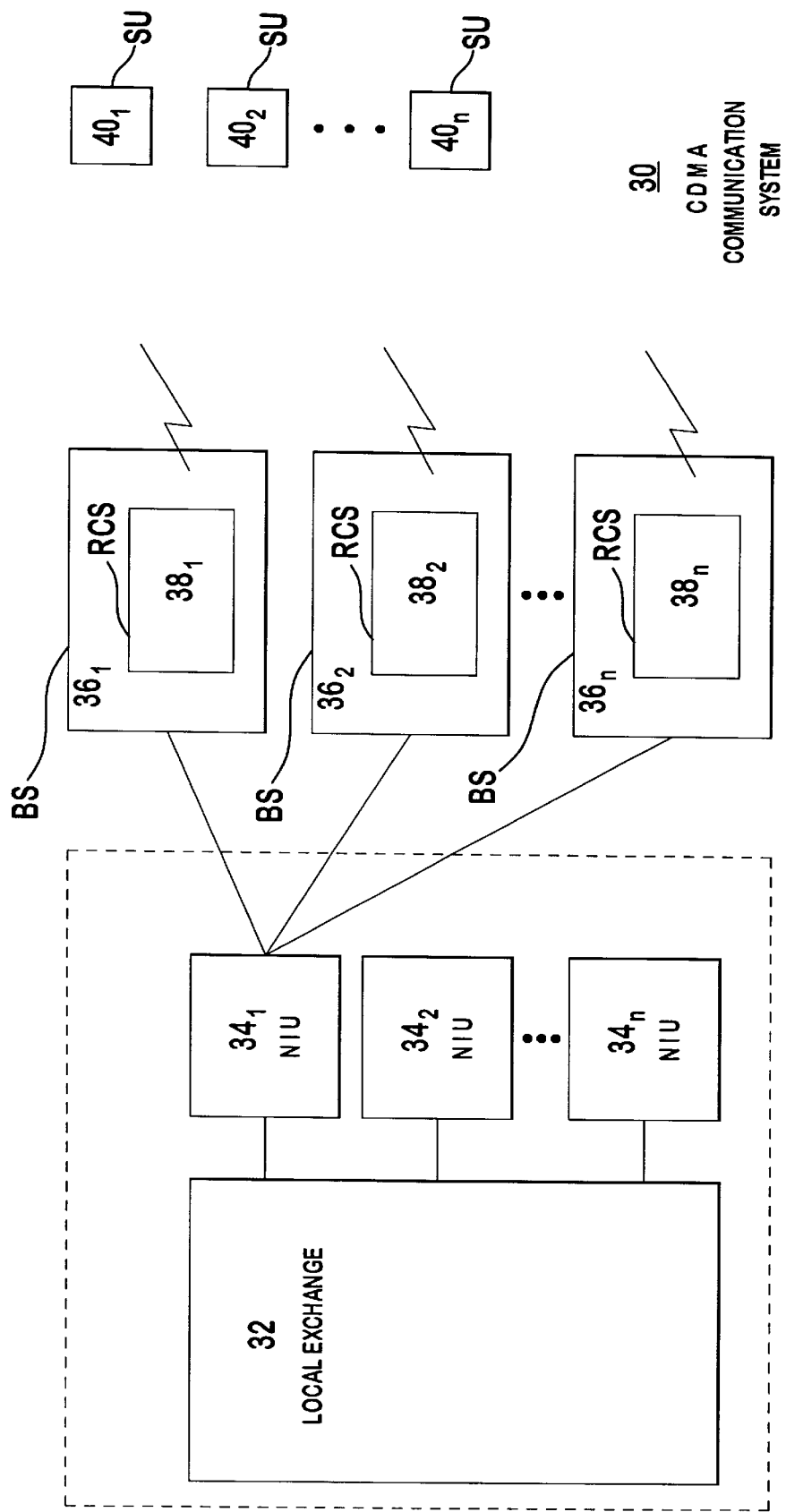
FIG. 3 is a block diagram of major components within a prior art CDMA system.

FIG. 2 illustrates a CDMA communication system 30. The communication system 30 comprises a plurality of base stations $36_1, 36_2 \ldots 36_n$. Each base station $36_1, 36_2 \ldots 36_n$ is in wireless communication with a plurality of subscriber units $40_1, 40_2 \ldots 40_n$, which may be fixed or mobile. Each subscriber unit $40_1, 40_2 \ldots 40_n$ communicates with either the closest base station $36_1$ or the base station $36_1$ which provides the strongest communication signal. Each base station $36_1, 36_2 \ldots 36_n$ is in communication with other components within the communication system 30 as shown in FIG. 3.

A local exchange 32 is at the center of the communications system 30 and communicates with a plurality of network interface units (NIUs) $34_1, 34_2 \ldots 34_n$. Each NIU is in communication with a plurality of radio carrier stations (RCS) $38_1, 38_2 \ldots 38_n$, or base stations $36_1, 36_2 \ldots 36_n$. Each (RCS) $38_1, 38_2 \ldots 38_n$ or base station $36_1, 36_2 \ldots 36_n$ communicates with a plurality of subscriber units $40_1, 40_2 \ldots 40_n$ within its communicating range.

Figure 4:
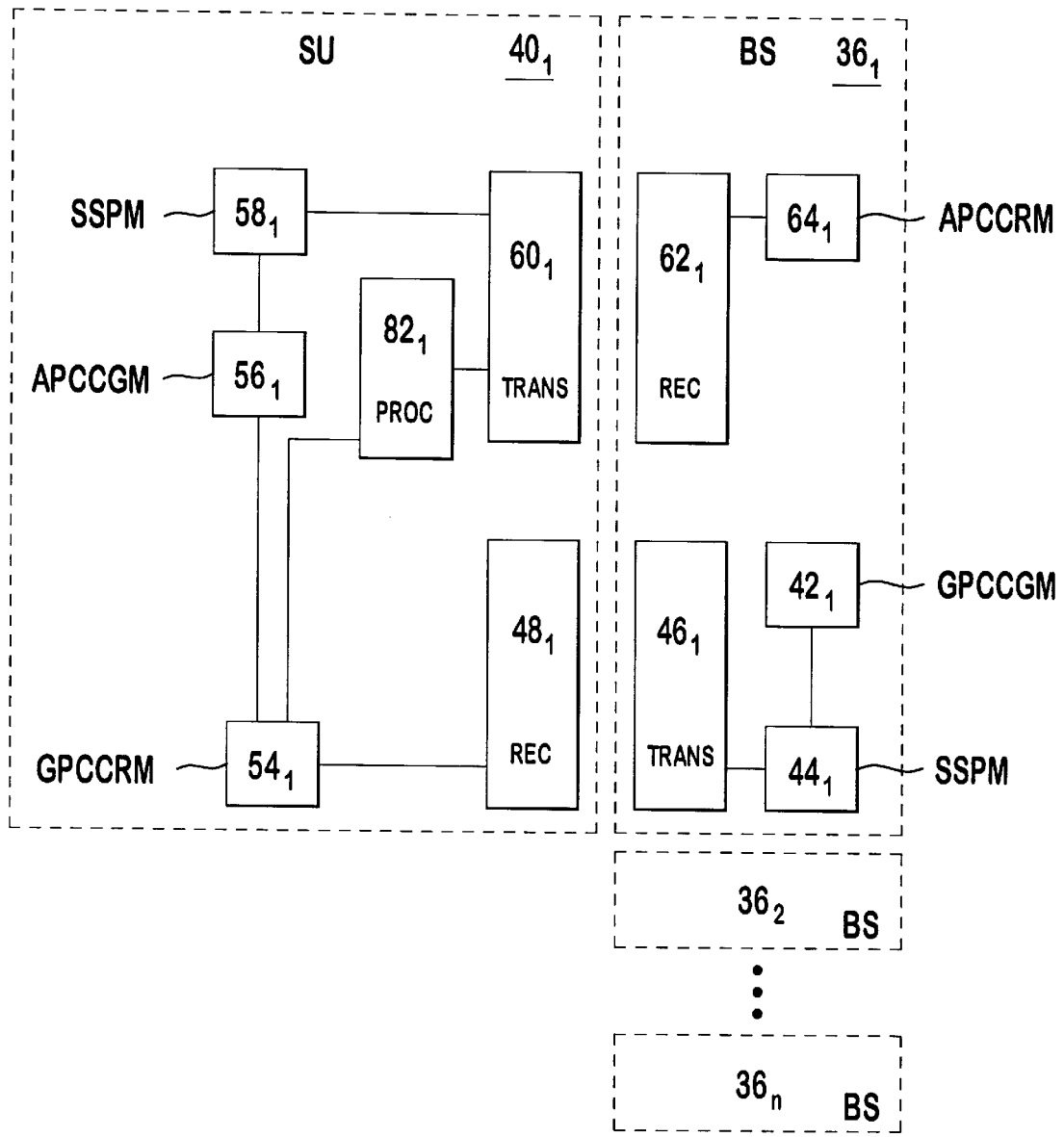
FIG. 4 is a block diagram of components within a prior art CDMA system.

FIG. 4 depicts a block diagram of the pertinent parts of an existing spread spectrum CDMA communication system. Each independent base station $36_1, 36_2 \ldots 36_n$ generates a unique global pilot signal using a global pilot chip code generating means $42_1$ and spread spectrum processing means $44_1$. The global pilot chip code generating means $42_1$ generates a unique pseudo random chip code sequence. The unique pseudo random chip code sequence is used to spread the resultant signals bandwidth such as to 15 MHZ as used in the B-CDMA™ air interface. The spread spectrum processing means modulates the global pilot chip code sequence up to a desired center frequency. The global pilot signal is transmitted to all subscriber units $40_1$ by the base station's transmitter $46_1$.

Figure 5:
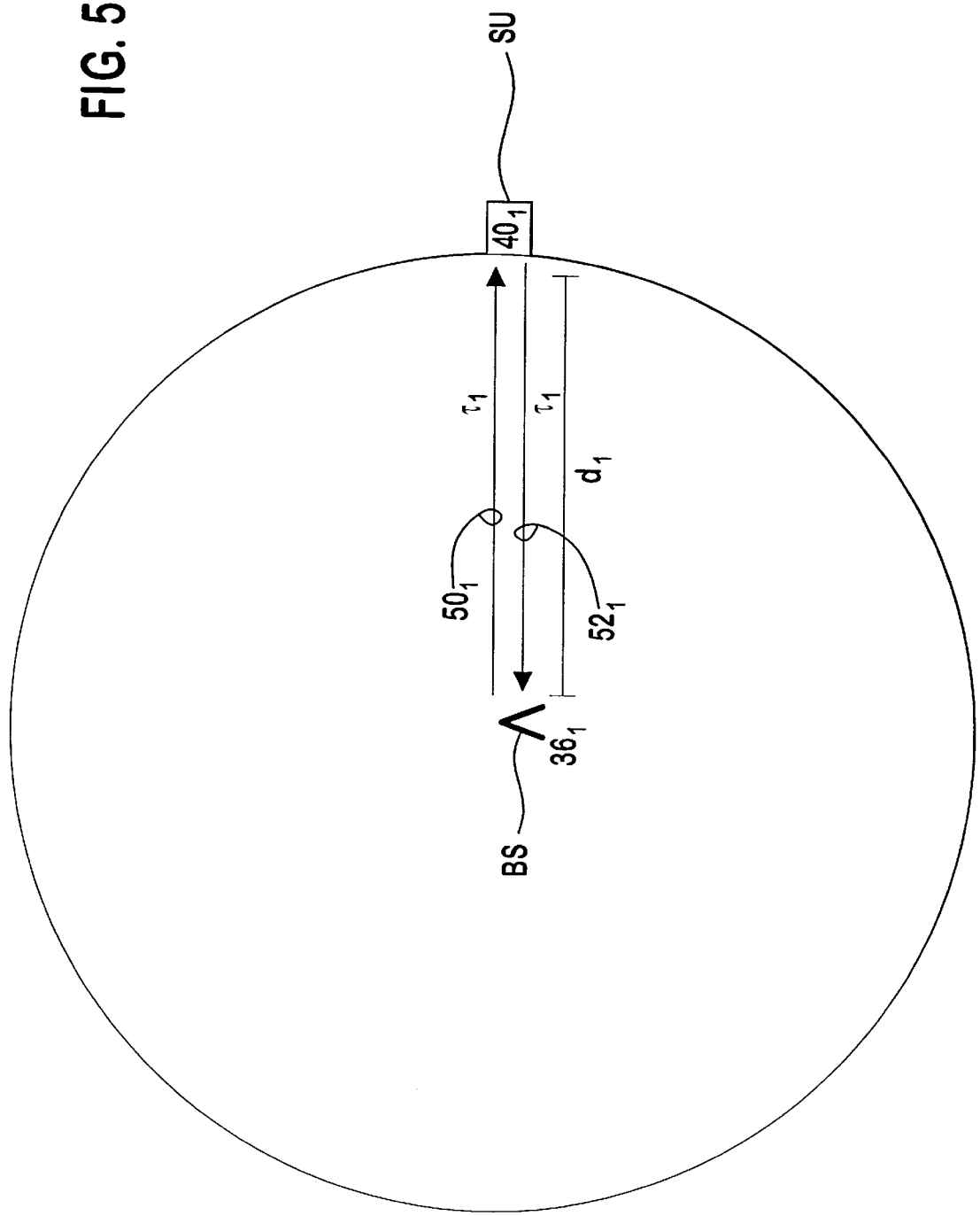
FIG. 5 is an illustration of a global pilot signal and an assigned pilot signal being communicated between a base station and a subscriber unit.

A receiver $48_1$ at a subscriber unit $40_1$ receives available signals from a plurality of base stations $36_1, 36_2 \ldots 36_n$. As shown in FIG. 5, the global pilot $50_1$ travels from the base station $36_1$ to the subscriber unit $40_n$ and can be represented as:

$$\tau_l = \frac{d_1}{c}. \qquad \text{Equation (1)}$$

The time the signal travels from the base station $36_1$ to the subscriber unit $40_1$, $\tau_1$, equals the distance between the base station $36_1$ and subscriber unit $40_1$, $d_1$, divided by the speed of light, c.

Referring back to FIG. 4, a global pilot chip code recovery means $54_1$ within the subscriber unit $40_1$ can receive global pilot chip code sequences from a plurality of base stations $36_1, 36_2 \ldots 36_n$. The subscriber unit $40_1$ generates a replica of a global pilot chip code sequence and synchronizes the generated replica's timing with the received global pilot $50_1$. The subscriber unit $40_1$ also has a processor $82_1$ to perform the many analysis functions of the subscriber unit $40_1$.

The subscriber unit $40_1$ generates an assigned pilot signal $52_1$ using assigned pilot chip code generating means $56_1$ and spread spectrum processing means $58_1$. The assigned pilot chip code generating means $56_1$ generates a pseudo random chip code sequence with its timing synchronized with the recovered global pilot chip code sequence. As a result, the assigned pilot chip code sequence is delayed by $\tau_1$ with respect to the base station $36_1, 36_2 \ldots 36_n$. The spread spectrum processing means $58_1$ generates the assigned pilot signal $52_1$ by modulating the assigned pilot chip code sequence up to a desired center frequency. The assigned pilot signal $52_1$ is transmitted to all base stations $36_1, 36_2 \ldots 36_n$ within range to receive the assigned pilot signal $52_1$.

The base station $36_1$ receives the assigned pilot signal $52_1$ with the base station's receiver $62_1$. The received assigned pilot $52_1$ travels the same distance $d_1$ as the global pilot signal $50_1$ as shown in FIG. 5. Accordingly, the received assigned pilot signal will be delayed by $\tau_1$ with respect to the mobile unit $40_1$ and by $2\tau_1$ with respect to the global pilot $50_1$ generated at the base station $36_1$.

Since the chip code sequence of the assigned pilot $52_1$ received at the base station $36_1$ will be delayed by $2\tau_1$ with respect to the chip code sequence of the global pilot signal $50_1$ generated at the base station $36_1$, the round trip propagation delay, $2\tau_1$, can be determined by comparing the timing of the two chip code sequences. Using the round trip propagation delay, $2\tau_1$, the distance $d_1$ between the base station $36_1$ and subscriber unit $40_1$ can be determined by:

$$d_l = c \cdot \frac{2\tau_l}{2}. \qquad \text{Equation (2)}$$

If a spreading sequence having a chipping rate of at least 80 ns is used and the communication system has the ability to track $\frac{1}{16}^{th}$ of a chip, the distance $d_1$ can be measured to within 2 meters.

Figure 6:
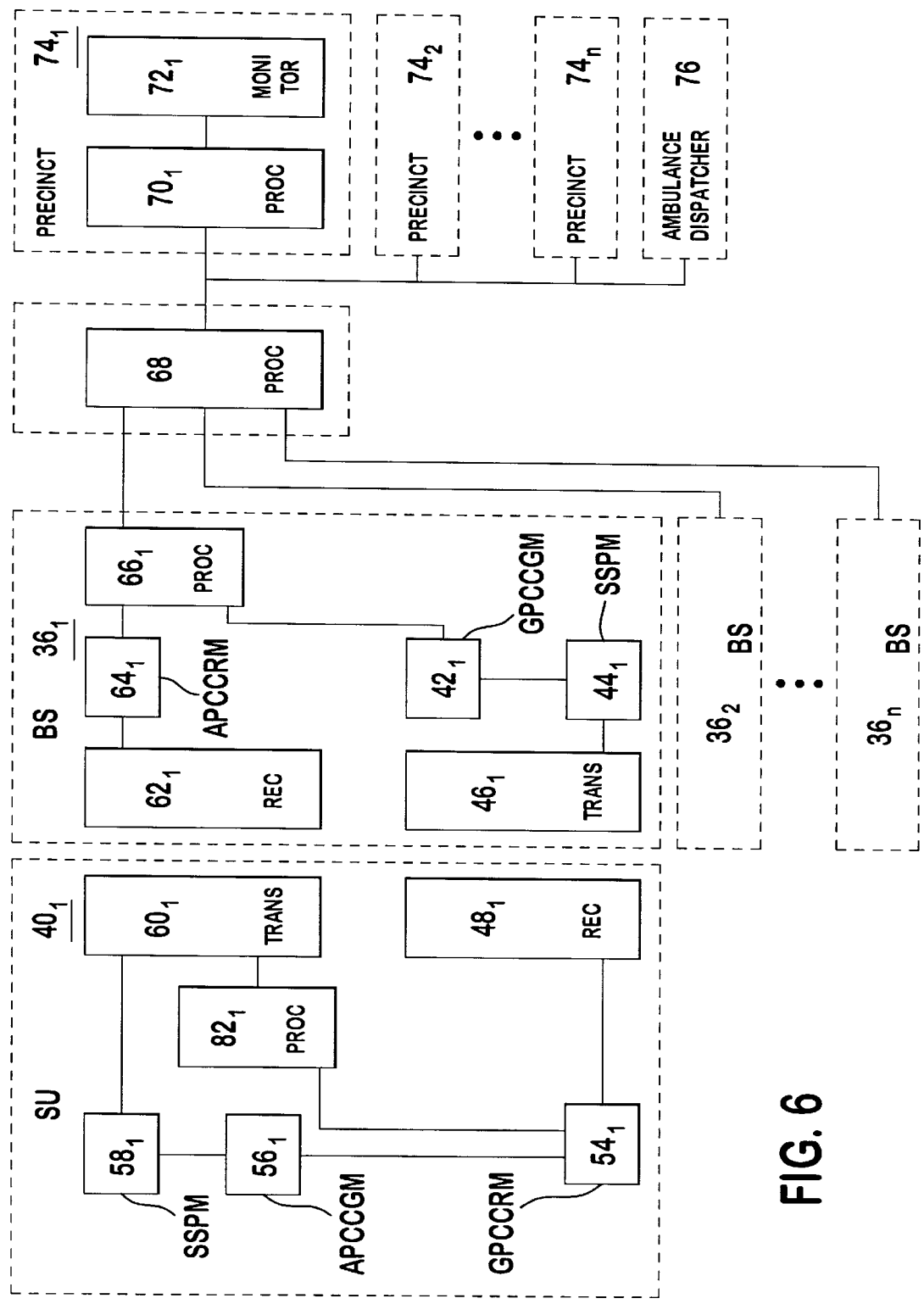
FIG. 6 is a block diagram of a first embodiment of the present invention using at least three base stations.

FIG. 6 is a block diagram of a first embodiment of the present invention. No additional hardware is required in the subscriber unit $40_1$. The only changes are implemented by software within the subscriber unit's processor $82_1$ and the processors $66_1, 66_2 \ldots 66_n, 68, 70_1, 70_2 \ldots 70_n$ located within the base station $36_1$, NIU $34_1$ or Local Exchange $32_1$, Precincts $74_1, 74_2 \ldots 74_n$ and Ambulance Dispatcher 76.

The subscriber unit $40_1$ is sent a signal by a base station $36_1$ indicating that a 911 call was initiated and to begin the subscriber location protocol. Upon receipt, the subscriber unit $40_1$ will sequentially synchronize its transmission chip code sequence to at least three base stations' chip code sequences. To allow reception by the base stations $36_2, 36_3 \ldots 36_n$ outside of the subscriber unit's normal communicating range, these transmissions will be sent at a higher than normal power level temporarily over-riding any adaptive power control algorithms.

A processor $66_1$ within each base station $36_1, 36_2 \ldots 36_n$ is coupled to the assigned pilot chip code recovery means $64_1$ and the global pilot chip code generator $42_1$. The processor $66_1$ compares the two chip code sequences to determine the round trip propagation delay $\tau_1, \tau_2 \ldots \tau_n$ and the respective distance $d_1, d_2 \ldots d_n$, between the subscriber unit $40_1$ and the respective base station $36_1, 36_2 \ldots 36_n$. Within either a NIU $34_1$ or the local exchange 32, a processor 68 receives the distances $d_1, d_2 \ldots d_1$, from the processors $66_1, 66_2 \ldots 66_n$ within all the base stations $36_1, 36_2 \ldots 36_n$. The processor 68 uses the distances $d_1, d_2 \ldots d_n$, to determine the location of the subscriber unit $40_1$ as follows.

Figure 7:
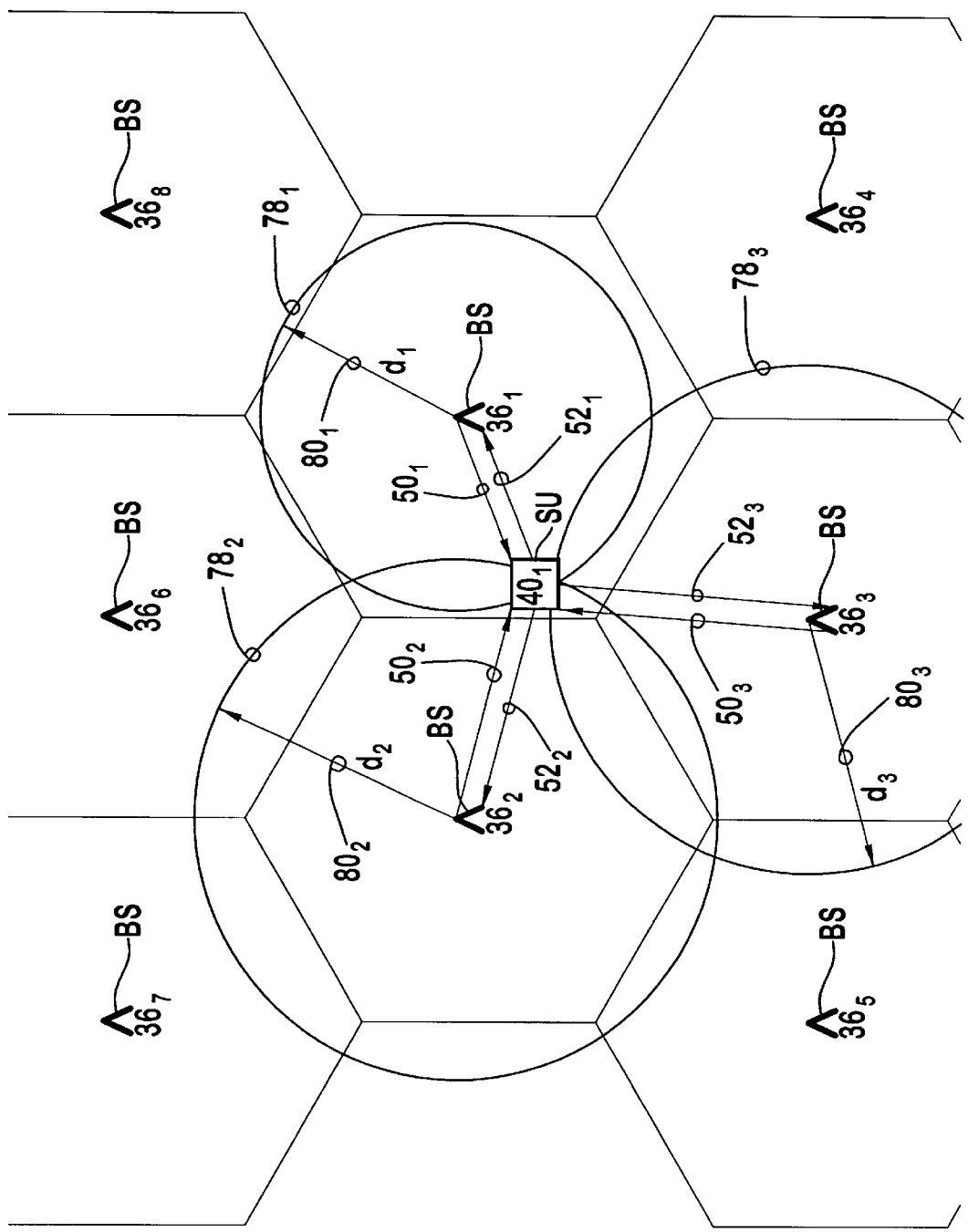
FIG. 7 is an illustration of locating a subscriber unit using the first embodiment of the present invention with at least three base stations.

By using the known longitude and latitude from three base stations $36_1, 36_2, 36_3$ and distances $d_1, d_2, d_3$, the location of the subscriber unit $40_1$ is determined. As shown in FIG. 7 by using the three distances $d_1, d_2, d_3$, three circles $78_1, 78_2, 78_3$ with radiae $80_1, 80_2, 80_3$ are constructed. Each circle $78_1, 78_2, 78_3$ is centered around a respective base station $36_1, 36_2, 36_3$. The intersection of the three circles $78_1, 78_2, 78_3$ is at the location of the subscriber unit $40_1$.

Using the Cartesian coordinates, the longitude and latitude corresponding with each base station $36_1, 36_2 \ldots 36_n$ is represented as $X_n, Y_n$, where $X_n$ is the longitude and $Y_n$ is the latitude. If X, Y represents the location of the subscriber unit $40_1$, using the distance formula the following equations result:

$$(X_1-X)^2+(Y_1-Y)^2=d_1^2 \quad \text{Equation (3)}$$

$$(X_2-X)^2+(Y_2-Y)^2=d_2^2 \quad \text{Equation (4)}$$

$$(X_3-X)^2+(Y_3-Y)^2=d_3^2 \quad \text{Equation (5)}$$

In practice due to small errors in calculating the distances $d_1$, $d_2$, $d_3$, Equations 3, 4 and 5 cannot be solved using conventional algebra. To compensate for the errors, a maximum likelihood estimation is used to determine the location and are well known to those skilled in the art. For increased accuracy, additional base stations $36_4$, $36_5$ . . . $36_n$ can be used to calculate additional distances for inclusion in the estimation analysis.

The subscriber unit's location is sent through the communication system 30 to at least one precinct $74_1$, $74_2$ . . . $74_n$ and an ambulance dispatcher 76. A processor $70_1$ within each precinct $74_1$, $74_2$ . . . $74_n$ and the ambulance dispatcher 76 receives the location of all 911 calls originating in the system and displays the location on a conventional computer monitor $72_1$. The display comprises a listing of all 911 calls and addresses on a geographic map.

An alternate approach reduces the number of processors by transmitting raw data through the communication system 30 and processing the raw data at a single site.

Figure 8:
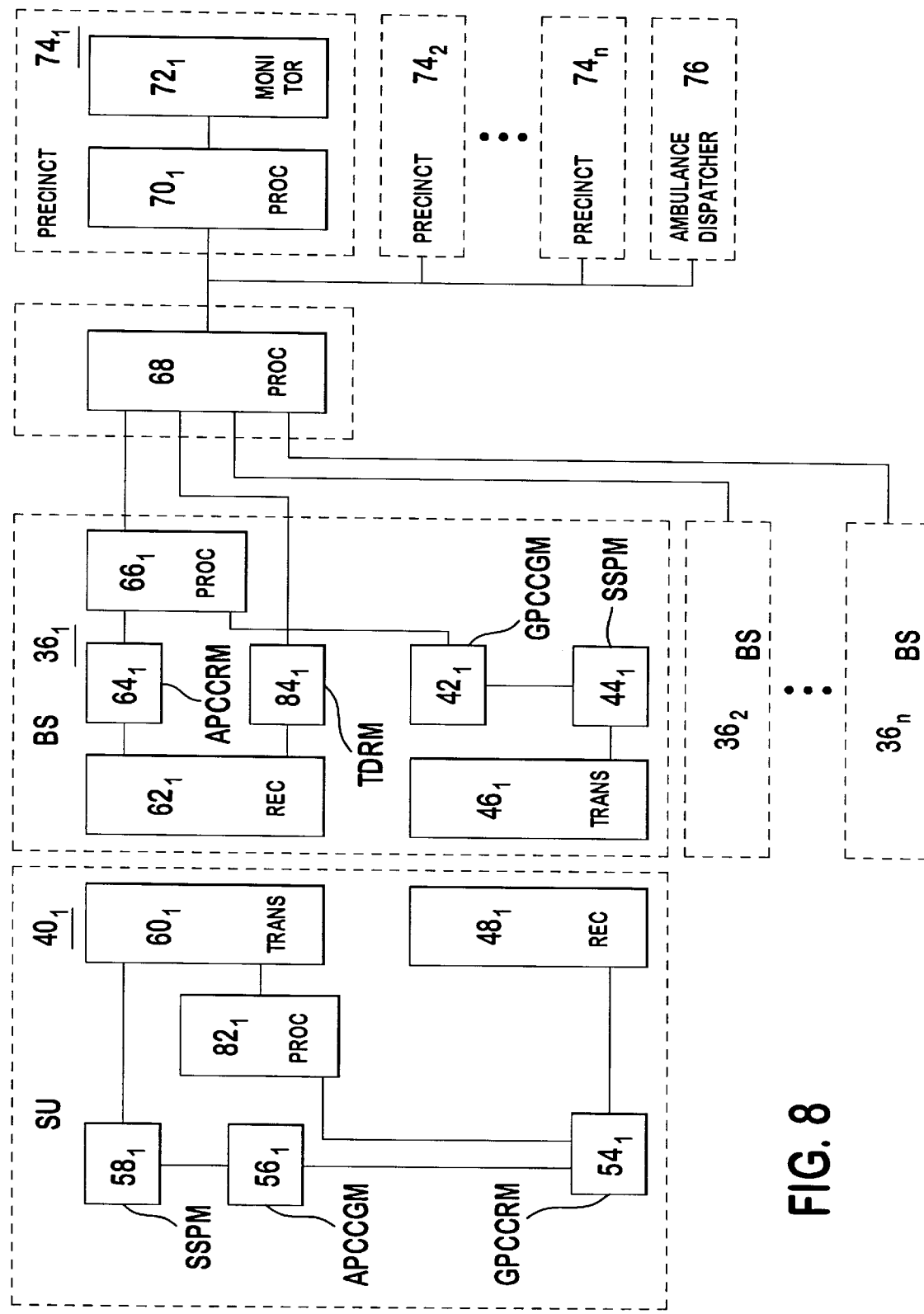
FIG. 8 is a block diagram of a second embodiment of the present invention showing components used in a subscriber unit.

FIG. 8 is a second embodiment of a location system. At least two base stations $36_1$, $36_2$ . . . $36_n$ have their internal timing synchronized with each other and transmit their respective global pilot signals $52_1$, $52_2$ . . . $52_n$ with time synchronized chip code sequences. The subscriber unit $40_1$ receives the global pilots $52_1$, $52_2$ . . . $52_n$. However, the received global pilots $52_1$, $52_2$ . . . $52_n$ are not synchronized. The global pilot $52_2$ from a first base station $36_1$ will travel distance $d_1$ and is delayed by $\tau_1$. The global pilot $52_2$ from a second base station $36_2$ travels distance $d_2$ and is delayed by $\tau_2$. The subscriber unit $40_1$ recovers each base station's global pilot chip code sequence with its global pilot chip code recovery means $54_1$. A processor $82_1$ within the subscriber unit $40_1$ is coupled to each global pilot chip code recovery means $54_1$, $52_2$ . . . $54_n$. The processor $82_1$ compares the chip code sequences of each pair of pilot chip code sequences and calculates the time differences $\Delta t_1$, $\Delta t_2$ . . . $\Delta t_n$ between the sequences as follows.

Within the subscriber unit $40_1$, the chip code sequences used by each base station $36_1$, $36_2$ . . . $36_n$ are stored. After synchronizing with the first base station's pilot $36_1$, the processor $82_1$ will store where within the sequence synchronization was obtained. This process is repeated for the other base stations $36_2$, $36_3$ . . . $36_n$. The synchronization process can be done sequentially (synchronizing to the first base station's chip code sequence then the second, etc.) or in parallel (synchronizing to all base stations at the same time).

By using the relative time difference between $\tau_1$, $\tau_2$, . . . $\tau_n$ each base station's chip code sequence and knowing that each base station's pilot was sent at the same time, with two base stations the time differences are calculated as follows:

$$\Delta t_1 = \tau_2 - \tau_1 \quad \text{Equation (6)}$$

$$\Delta t_2 = \tau_3 - \tau_2 \quad \text{Equation (7)}$$

The time differences $\Delta t_1$, $\Delta t_2$ . . . $\Delta t_n$ are transmitted to at least one of the base stations $36_1$.

At least one base station $36_1$ recovers the time difference data from the received signals using time difference recovery means $84_1$. The time difference data is sent with the distance data $d_1$ through the communications system to a processor 68. The processor 68 determines the location of the subscriber unit $40_1$ using the time difference data $\Delta t_1$, $\Delta t_2$ . . . $\Delta t_n$ and the distance data $d_1$, $d_2$ . . . $d_n$ as follows.

Figure 9:
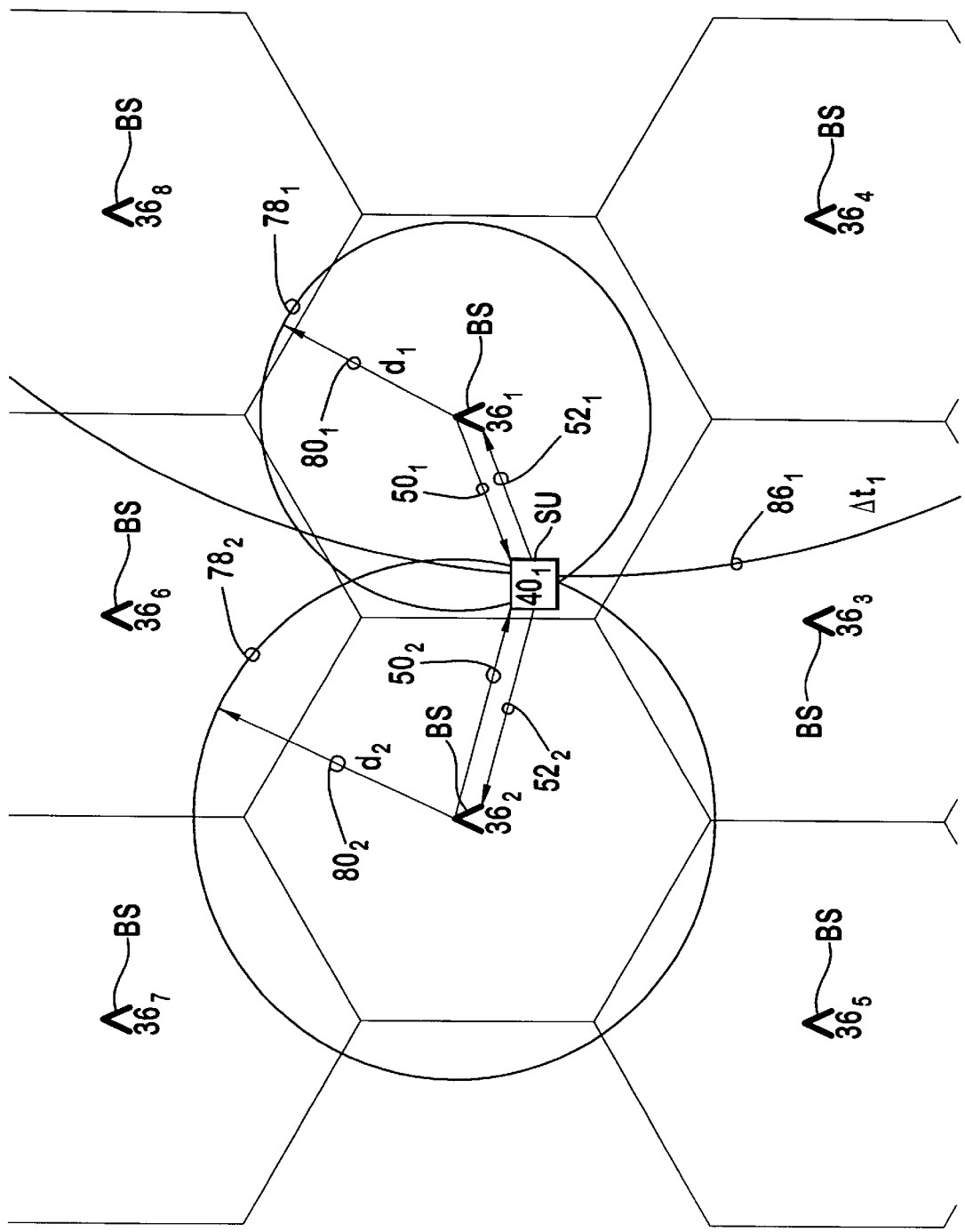
FIG. 9 is an illustration of locating a subscriber unit using the second embodiment of the present invention with two base stations.

Using information from only two base stations $36_1$, $36_2$ as shown in FIG. 9, the processor uses distances $d_1$, $d_2$ to create two circles $78_1$, $78_2$. Using the time difference, $\Delta t_1$, a hyperbola $86_1$ can be constructed as follows.

All the points along the hyperbola $86_1$ receive the global pilot signals $52_1$, $52_2$ from the synchronized base stations $36_1$, $36_2$ with the same time difference, $\Delta t_1$. The time difference $\Delta t_1$ can be converted to a distance difference $\Delta d_1$ by substituting $\Delta t_1$ or $t_1$ and $\Delta d_1$ for $d_1$ in Equation 1. Using the distance formula and X, Y as the location of the subscriber unit $40_1$, the following equation results:

$$\Delta d_1 = \sqrt{(X_1-X)^2+(Y_1-Y)^2} - \sqrt{(X_2-X)^2+(Y_2-Y)^2} \quad \text{Equation (8)}$$

By using Equation 8 with Equations 3 and 4 in a maximum likelihood estimation, the location of the subscriber unit $40_1$ can be determined. The subscriber unit's location is subsequently sent to the nearest police precinct $74_1$, $74_2$ . . . $74_n$ and ambulance dispatcher 76 in the cellular area.

Figure 10:
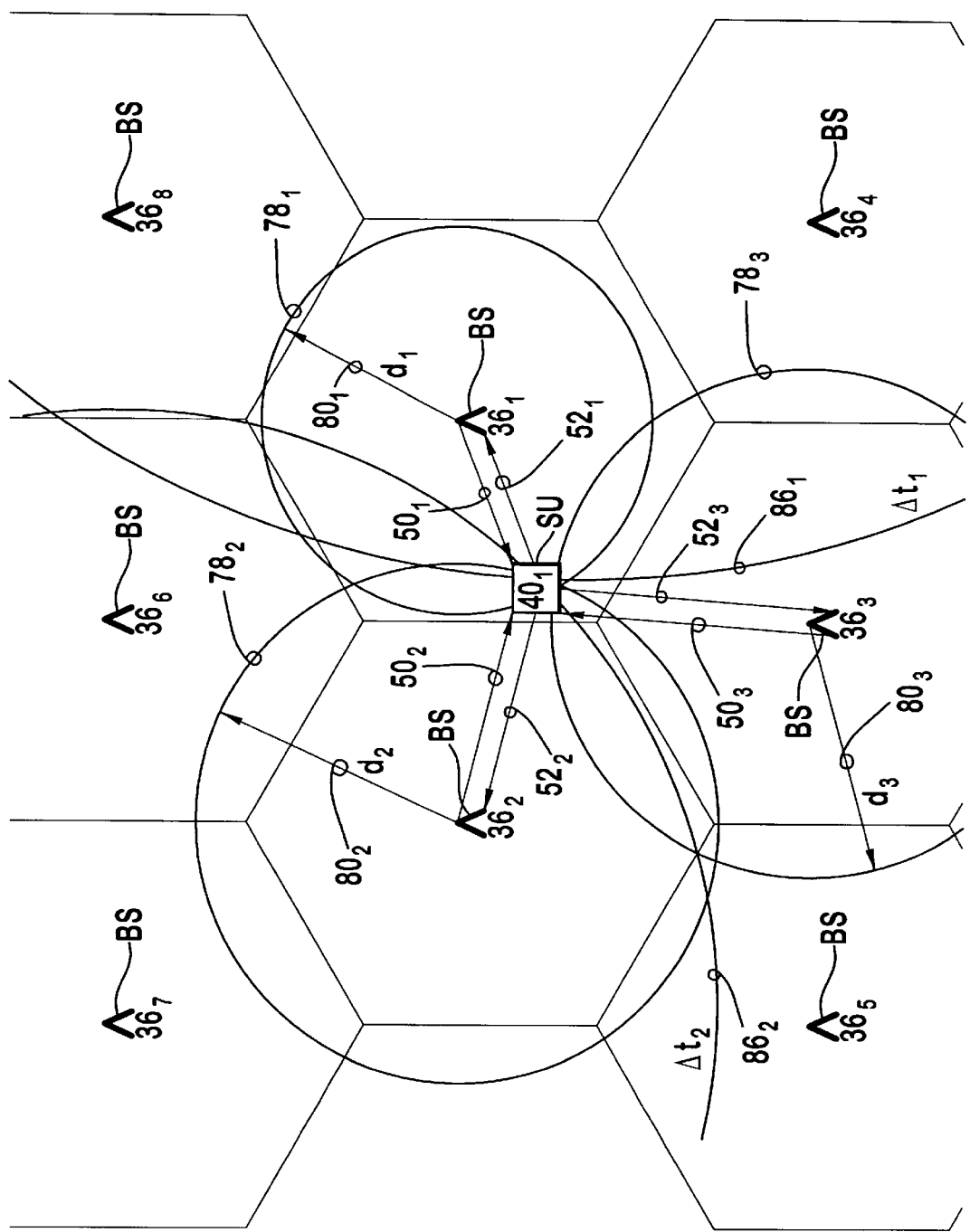
FIG. 10 is an illustration of locating a subscriber unit using the second embodiment of the present invention with more than two base stations.

For improved accuracy, additional base stations $36_1$, $36_2$ . . . $36_n$ are used. FIG. 10 shows the invention used with three base stations $36_1$, $36_2$, $36_3$. The distances $d_1$, $d_2$, $d_3$ are used to create three circles $78_1$, $78_2$, $78_3$. Using time differences $\Delta t_1$, $\Delta t_2$, two intersecting hyperbolas $86_1$, $86_2$ are constructed. With maximum likelihood estimation, the subscriber units' location calculated with two hyperbolas $86_1$, $86_2$, and three circles $78_1$, $78_2$, $78_3$ yields greater accuracy.

As shown in FIG. 8, the subscriber unit $40_1$ is required to process each global pilot chip code sequence to determine the time differences $\Delta t_1$, $\Delta t_2$ . . . $\Delta t_n$. An alternate approach removes the processing from the subscriber unit $40_1$.

With reference to FIG. 6, the mobile unit $40_1$ will synchronize the assigned pilot to one of the base station's global pilot chip code sequences, such as the nearest base station $36_1$ with a delay of $\tau_1$. The assigned pilot $50_1$ is transmitted to all base stations $36_1$, $36_2$ . . . $36_n$. The assigned pilot $50_1$ will be received at each base station with a respective delay, $\tau_1+\tau_1$, $\tau_2+\tau_2$, $\tau_3+\tau_3$. Each base station $36_1$, $36_2$ . . . $36_n$ will send the delayed chip code sequence along with the calculated distance to a processor 68 located in a NIU $34_1$ or local exchange 32. The processor 68 will calculate the time differences $\Delta t_1$, $\Delta t_2$ . . . $\Delta t_n$ by comparing the received assigned pilot chip code sequences. Since all received assigned pilot chip code sequences are delayed by $\tau_1$, the $\tau_1$ delay will cancel out of the resultant time differences $\Delta t_1$, $\Delta t_2$ . . . $\Delta t_n$. Accordingly, the subscriber unit $40_1$ can be located using hyperbolas $86_1$, $86_2$ as previously described.

Figure 11:
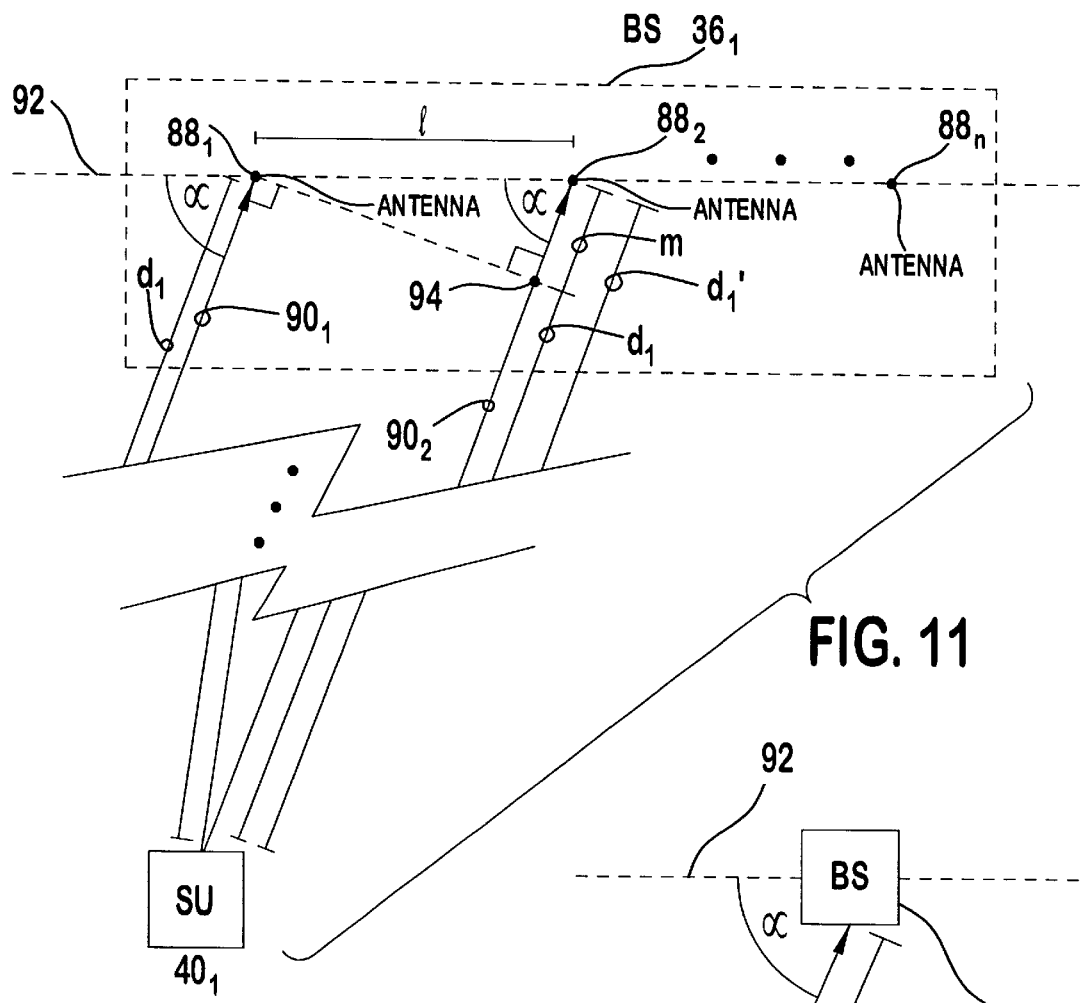
FIG. 11 is a detailed illustration of the third embodiment of the present invention having a base station with multiple antennas.
Figure 12:
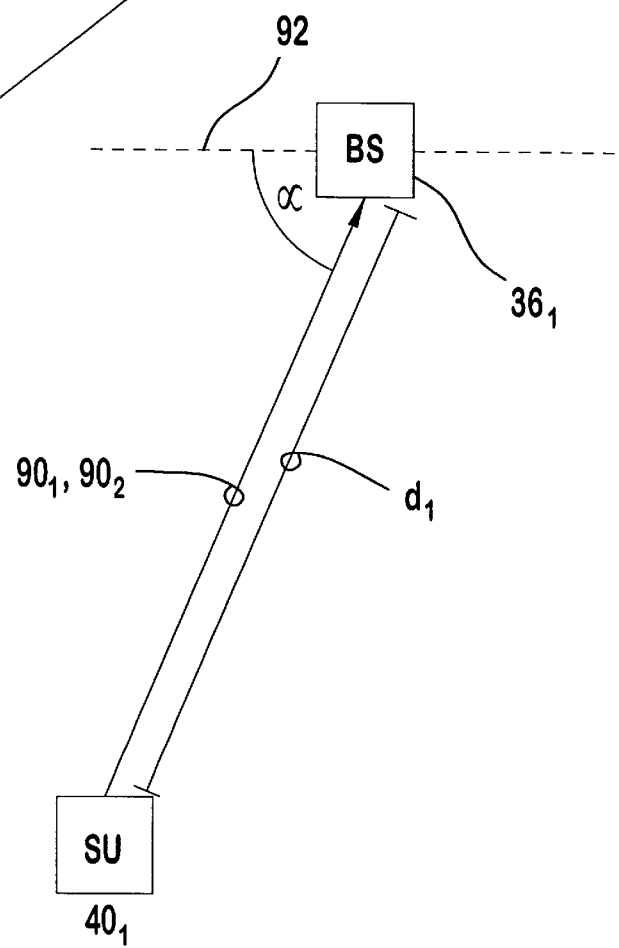
FIG. 12 is an illustration of the third embodiment having a base station with multiple antennas.
Figure 13:
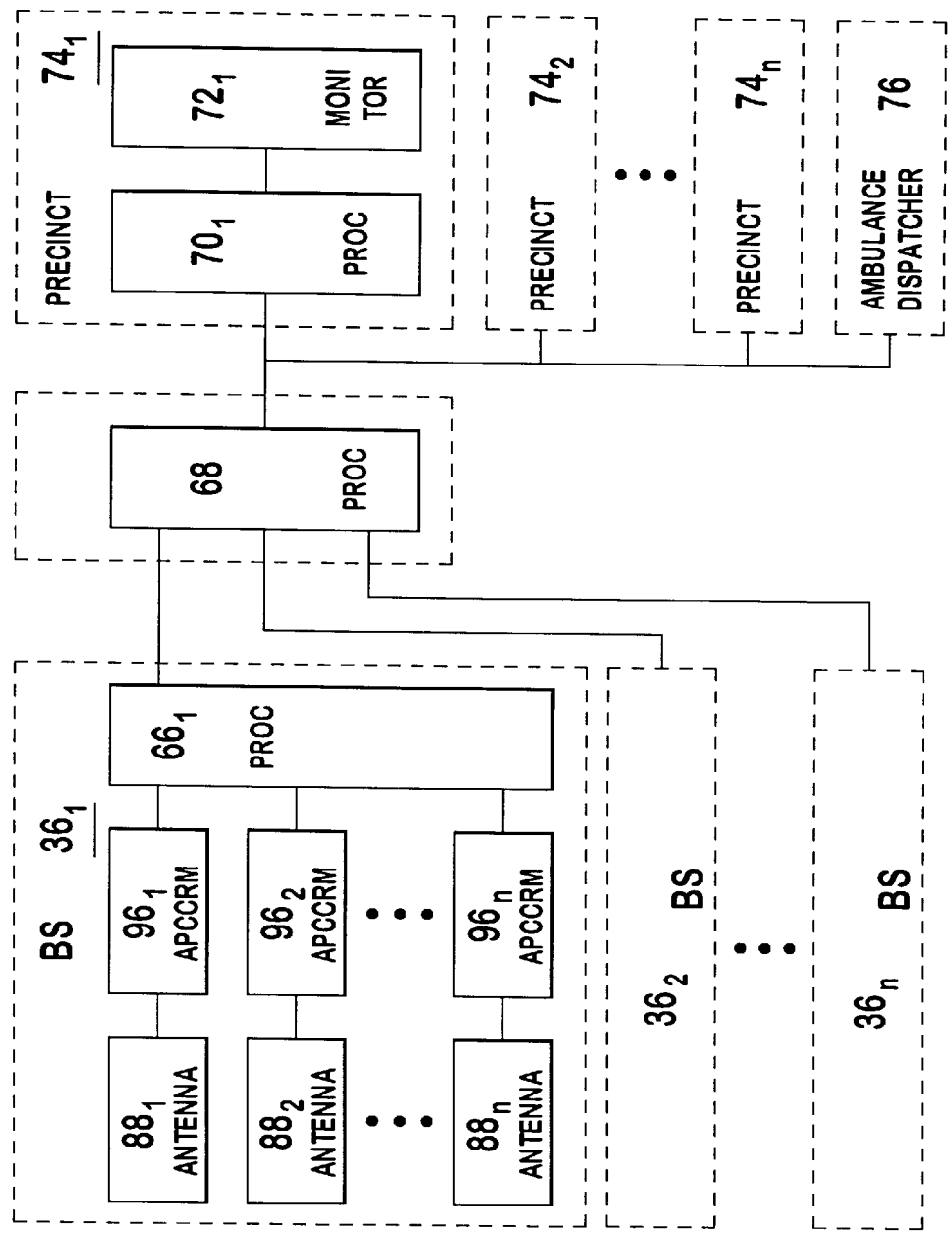
FIG. 13 is a block diagram of components used in the third embodiment.

Another embodiment shown in FIGS. 11, 12 and 13 uses a base station $36_1$ with multiple antennas $88_1$, $88_2$ . . . $88_n$. Two of the antennas $88_1$, $88_2$ lie along a centerline 92 at a known distance, l, apart as shown in FIG. 11. Both antennas $88_1$, $88_2$ receive the assigned pilot signal $90_1$, $90_2$ from the subscriber unit $40_1$. However, the antenna $88_2$ further away from the subscriber unit $40_1$ receives the signal over a slightly longer distance $d_1'$ and with a slight delay with respect to the nearer antenna $88_1$. This delay results in a carrier phase difference, $\phi$, between the signals received at each antenna as shown on FIG. 13. A processor 66 using the received carrier phase difference and the chip code sequence recovered by each assigned pilot chip code recovery means $96_1$, $96_2$ . . . $96_n$ can determine the location of the subscriber unit $40_1$ as follows.

As shown in FIG. 12, the subscriber unit $40_1$ is located at distance $d_1$ at angle a from the centerline 92 of the antennas $88_1$, $88_2$. As seen at the scale of FIG. 12 both received assigned pilot signals $90_1$, $90_2$ appear to be coincident. However, as shown in FIG. 11, the received assigned pilot signals $90_1$, $90_2$ are slightly separated. The received assigned pilot signal $90_1$ returning to the first antenna $88_1$ travels a distance $d_1$. The received assigned pilot signal $90_2$ returning to the second antenna $88_2$ travels a slightly longer distance $d_1'$. As shown in FIG. 11, the difference between the two distances $d_1$, $d_1'$ is a distance m.

Since the distances $d_1$, $d_1'$ between the antennas $88_1$, $88_2$ and the subscriber unit $40_1$ are much larger than the distance l between the antennae $88_1$, $88_2$ both received assigned pilot signals $90_1$, $90_2$ follow approximately parallel paths. By constructing a right triangle using a point 94 which is distance $d_1$ from the subscriber unit $40_1$ as shown in FIG. 11, the angle $\alpha$ can be determined by the following geometric relationship:

$$\alpha = \cos^{-1}(m/l). \quad \text{Equation (9)}$$

The distance m can be determined by using the carrier phase difference, $\phi$, between the two received signals $90_1$, $90_2$ as follows:

$$m = \frac{\phi \cdot \lambda}{2\pi} \quad \text{Equation (10)}$$

The distance m equals the phase difference between the two signals, $\phi$, in radians multiplied by the wavelength of the signal, $\lambda$, divided by $2\pi$. The wavelength, $\lambda$, can be derived from the known frequency f of the assigned pilot signal as follows:

$$\lambda = c/f. \quad \text{Equation (11)}$$

The processor 68 also compares the chip code sequences of the global pilot generating means $42_1$ with the recovered assigned pilot chip code sequence to determine the distance $d_1$ as shown in FIG. 6. Using both the angle $\alpha$ and distance $d_1$, the processor $66_1$ locates the subscriber unit $40_1$ using simple geometry. There are many techniques well known to those skilled in the art to eliminate the ambiguity between locations above and below the antennas $88_1$, $88_2$. One such technique is using antennas employing sectorization. Subsequently, the subscriber unit's location is sent to the precincts $74_1$, $74_2$ . . . $74_n$ and ambulance dispatcher 76. Additional antennas may be used to improve on the accuracy of the system.

An alternate embodiment uses more than one base station $36_1$, $36_2$ . . . $36_n$. A processor 68 located within either a NIU $34_1$ or the local exchange 32 collects distance and angle information from more than one base station $36_1$, $36_2$ . . . $36_n$ as well as the time differences $\Delta t_1$, $\Delta t_2$ . . . $\Delta t_n$, between the base stations $36_1$, $36_2$ . . . $36_n$. Using the maximum likelihood estimation technique, the processor 68 determines a more accurate location of the subscriber unit $40_1$.

Figure 14:
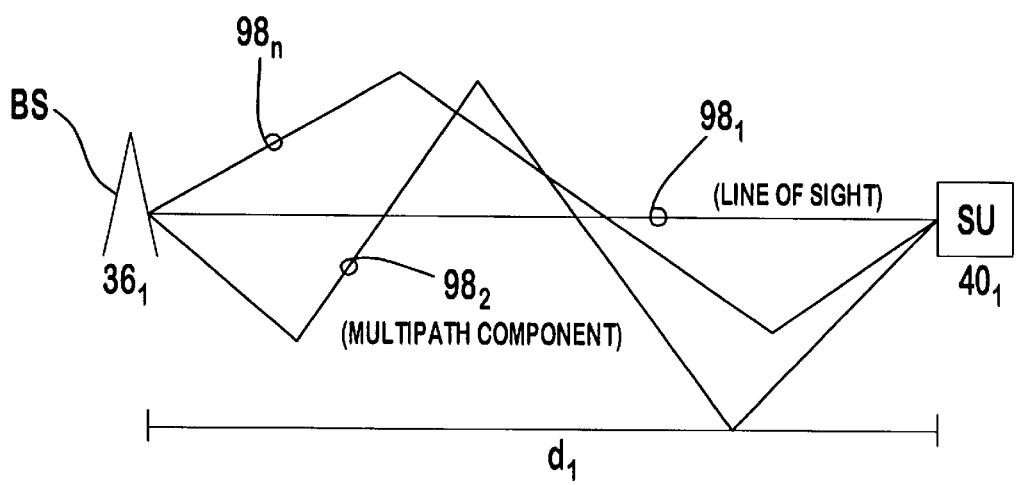
FIG. 14 is an illustration of multipath.

A fourth embodiment corrects for multipath. FIG. 14 illustrates multipath. A signal such as a global pilot signal is transmitted from a base station $36_1$. The signal follows a multitude of paths $98_1$, $98_2$ . . . $98_n$ between the base station $36_1$ and subscriber unit $40_1$.

Figure 15:
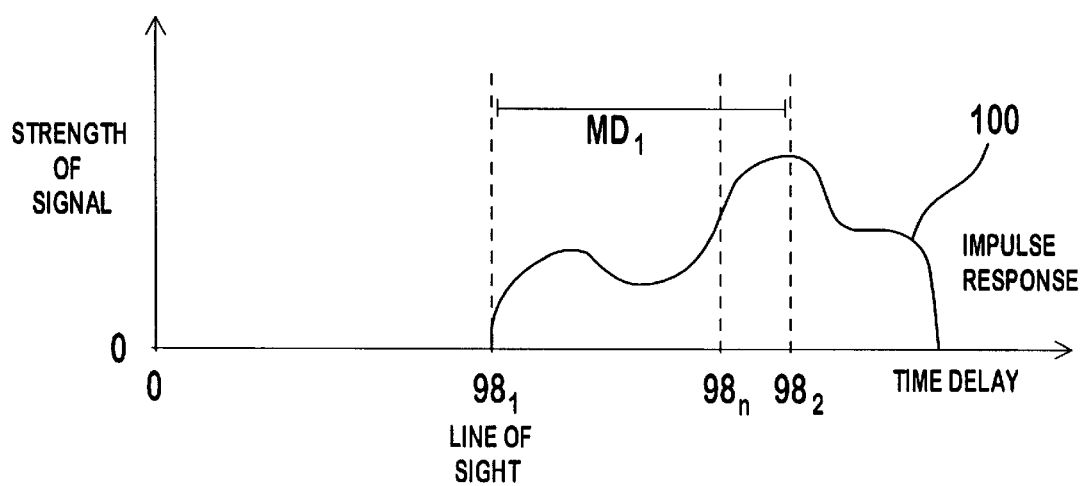
FIG. 15 is a graph of a typical impulse response of multipath components.

FIG. 15 is a graph showing the impulse response 136 of the received multipath components. Since each received multipath component travels a unique path, it arrives at a receiver with a propagation delay determined by the length of the path $98_1$, $98_2$ . . . $98_n$. The impulse response 106 shows the collective signal magnitude of all the multipath components received at each propagation delay.

The previously described subscriber unit location techniques assumed the subscriber unit $40_1$ synchronizes with the line of sight multipath component $98_1$ traveling distance $d_1$. However, if the subscriber unit synchronizes with a non-line of sight multipath component $98_1$, $98_2$ . . . $98_n$, the distance calculation will be in error due to the delay $MD_1$ as shown in FIG. 15.

Figure 16:
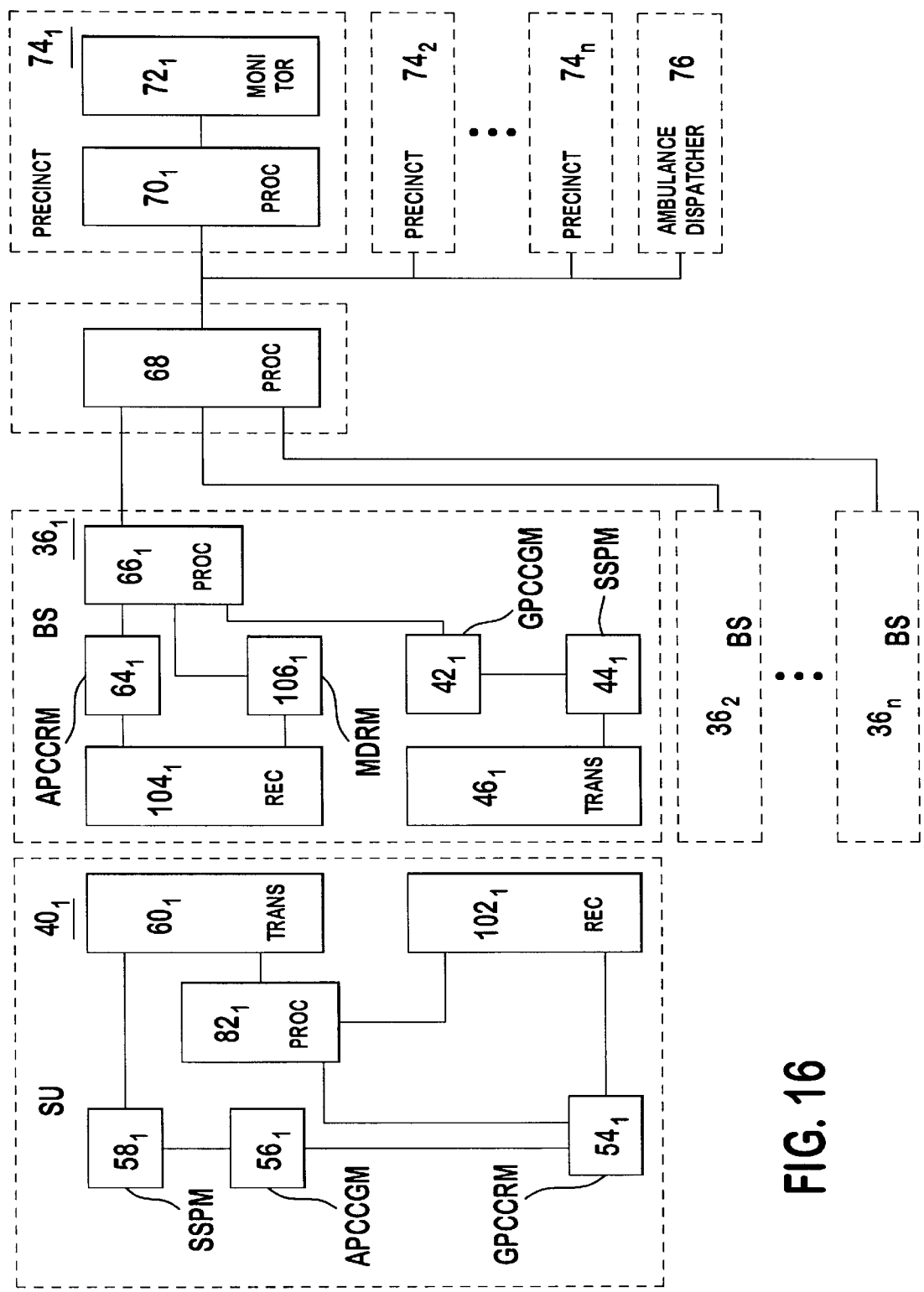
FIG. 16 is a block diagram of components within a fourth embodiment correcting for multipath.

FIG. 16 is a system correcting for errors resulting from multipath. The global pilot $50_1$ is sent from the base station $36_1$ to subscriber unit $40_1$. The subscriber unit $40_1$ collects all of the multipath components using a multipath receiver $102_1$ such as disclosed in U.S. patent application Ser. No. 08/669,769, Lomp et al., incorporated here by reference. A processor $82_1$ within the subscriber unit $40_1$ analyzes the impulse response 100 of the received global pilot signal $50_1$.

Since the line of sight multipath component $98_1$ travels the shortest distance $d_1$, the first received component $98_1$ is the line of sight component. If the line of sight component is not received, the first received component $98_1$ will be the closest and, accordingly, the best available estimate for the line of sight component. The processor $82_1$ compares the chip code sequence of the first received component $98_1$ with the chip code sequence used to synchronize the assigned pilot chip code sequence. This comparison determines the delay due to multipath, $MD_1$. The multipath delay, $MD_1$, is transmitted to the base station $36_1$.

A processor $66_1$ and multipath receiver $104_1$ within the base station $36_1$ perform the same analysis on the received assigned pilot signal. As a result, the multipath delay, $MD_2$, of the assigned pilot signal is determined. Additionally, multipath delay recovery means $106_1$ recovers the transmitted global pilot signal's multipath delay $MD_1$ for use by the processor $66_1$. The processor $66_1$ compares the generated global pilot chip code sequence to the recovered assigned pilot chip code sequence to determine the round trip propagation delay $2\tau_1$. To correct for multipath, the processor $66_1$ subtracts both the global pilot signal's multipath delay $MD_1$ and the assigned pilot signals multipath delay $MD_2$ from the calculated round trip propagation delay, $2\tau_1$. The corrected round trip propagation delay is used to determine the subscriber unit's location in one of the techniques as previously described.

Although the invention has been described in part by making detailed reference to certain specific embodiments, such detail is intended to be instructive rather than restrictive. It will be appreciated by those skilled in the art that many variations may be made in the structure and mode of operation without departing from the scope of the invention as disclosed in the teachings herein.

What is claimed is:

1. A base station comprising:
    means for transmitting a first spread spectrum signal having a first code;
    means for receiving and analyzing an impulse response of multipath components of a second spread spectrum signal having a second code to determine a first received component of the second spread spectrum signal, the second spread spectrum signal time synchronized with the first spread spectrum signal; and
    means for making a distance determination based on in part a timing difference between the second code of the received second spread spectrum signal and the first code of the base station's transmitted first spread spectrum signal and the determined first received component for that base station's received second spread spectrum signal.

2. The base station of claim 1 wherein the first spread spectrum signal is a pilot signal.

3. The base station of claim 1 wherein the distance determination is determined by dividing the timing difference by two times a speed of light.

4. A base station comprising:

a plurality of antennas, each of the antennas separated by a known distance;

means for transmitting a first spread spectrum signal having a first code;

means for receiving, using the plurality of antennas, and analyzing an impulse response of multipath components of a second spread spectrum signal having a second code to determine a first received component of the second spread spectrum signal, the second spread spectrum signal time synchronized with the first spread spectrum signal;

means for making a distance determination based on in part a timing difference between the second code of the received second spread spectrum signal and the first code of the base station's transmitted first spread spectrum signal and the determined first received component for that base station's received second spread spectrum signal;

means for comparing a phase difference of a carrier signal of the second spread spectrum signal as received by each of the plurality of antennas; and means for determining an angle of the received second spread spectrum signal using the distance determination and the phase difference.

5. The base station of claim 1 wherein the first spread spectrum signal is a pilot signal.

6. The base station of claim 1 wherein two of the antennas are seperated by a distance 1, the carrier phase difference is $\phi$, a wave length of the carrier is $\lambda$ and a value m is per $$m = \frac{\phi \cdot \lambda}{2\pi}$$

and the determined angle $\alpha$ is per $$\alpha = \cos^{-1}(m/1).$$

* * * * *

UNITED STATES PATENT AND TRADEMARK OFFICE
CERTIFICATE OF CORRECTION

PATENT NO. : 6,748,008 B2
APPLICATION NO. : 10/074398
DATED : June 8, 2004
INVENTOR(S) : David K. Mesecher It is certified that error appears in the above-identified patent and that said Letters Patent is hereby corrected as shown below:

IN THE SPECIFICATION

At column 3, line 36, after the word "unit", delete "$40_n$," and insert therefor -- $40_1$ --.

At column 4, line 49, after the word "distances", delete "$d_1,d_2...d_1$" and insert therefor -- $d_1,d_2...d_n$ --.

At column 5, line 31, after the word "pilot", delete "$52_2$" and insert therefor --$52_1$ --.

At column 5, line 38, after the word "$54_1$" delete "$52_2$" and insert therefor --$54_2$ --.

At column 6, line 9, after the word "$\Delta\tau_1$", delete "or" and insert therefor --for--.

At column 6, line 13, Equation (8), delete "$\Delta d_1 = \sqrt{(X_{1-X)^2 +(Y_{1-Y})^2}} - \sqrt{(X_{2-X)_2 +(Y_{2-Y})^2}}$" and insert therefor -- $\Delta d_1 = \sqrt{(X_1 - X)^2 + (Y_1 - Y)^2} - \sqrt{(X_2 - X)^2 + (Y_2 - Y)^2}$ --

At column 6, line 37, delete "$\tau_1+\tau_1,\tau_2+\tau_2,\tau_3+\tau_3$" and insert therefor --$\tau_1+\tau_1,\tau_1+\tau_2,\tau_1+\tau_3$ --.

At column 6, line 43, after the word "by", delete "$\tau_{1,the\ \tau 1}$" and insert therefor --$\tau_1$, the $\tau_1$ --.

At column 6, line 63, after the word "angle", delete "a" and insert therfor -- $\alpha$ --.

At column 8, line 34, after the word "pilot", delete "signals" and insert therefor --signal's--.

UNITED STATES PATENT AND TRADEMARK OFFICE
CERTIFICATE OF CORRECTION

PATENT NO. : 6,748,008 B2
APPLICATION NO. : 10/074398
DATED : June 8, 2004
INVENTOR(S) : David K. Mesecher It is certified that error appears in the above-identified patent and that said Letters Patent is hereby corrected as shown below:

IN THE CLAIMS

In claim 6, column 10, line 11, delete "seperated", and insert therefor --separated--.

Signed and Sealed this

Twenty-fifth Day of September, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,748,008 B2 | Page 1 of 1 |
| APPLICATION NO. | : 10/074398 | |
| DATED | : June 8, 2004 | |
| INVENTOR(S) | : David K. Mesecher | |

It is certified that error appears in the above-identified patent and that said Letters Patent is hereby corrected as shown below:

IN THE CLAIMS

In claim 5, column 10, line 7, delete "1", and insert therefor --4--.

In claim 6, column 10, line 9, delete "1", and insert therefor --4--.

Signed and Sealed this

Sixteenth Day of August, 2011

David J. Kappos
*Director of the United States Patent and Trademark Office*